United States Patent
Yoshiura et al.

(10) Patent No.: US 9,285,782 B2
(45) Date of Patent: Mar. 15, 2016

(54) MOTOR CONTROL DEVICE

(71) Applicant: KABUSHIKI KAISHA YASKAWA DENKI, Kitakyushu-shi (JP)

(72) Inventors: Yasufumi Yoshiura, Fukuoka (JP); Yasuhiko Kaku, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 283 days.

(21) Appl. No.: 13/771,085

(22) Filed: Feb. 20, 2013

(65) Prior Publication Data

US 2014/0055074 A1 Feb. 27, 2014

(30) Foreign Application Priority Data

Aug. 24, 2012 (JP) ................................. 2012-185923

(51) Int. Cl.
*G05B 11/42* (2006.01)
*G05B 19/416* (2006.01)

(52) U.S. Cl.
CPC .............. *G05B 11/42* (2013.01); *G05B 19/416* (2013.01)

(58) Field of Classification Search
USPC ...................... 318/610, 400.07, 432
See application file for complete search history.

(56) References Cited

U.S. PATENT DOCUMENTS

2004/0054440 A1* 3/2004 Zhang .................... G05B 13/04
  700/245
2007/0210731 A1* 9/2007 Yoshiura .............. G05B 19/404
  318/163

FOREIGN PATENT DOCUMENTS

| JP | 2002-182705 | 6/2002 |
| JP | 3856215 B2 | 9/2003 |
| JP | 2008-299573 | 12/2008 |
| JP | 2008299573 A * | 12/2008 |
| WO | WO 2005/093939 | 10/2005 |

OTHER PUBLICATIONS

Japanese Office Action for corresponding JP Application No. 2012-185923, Mar. 19, 2014.
Chinese Office Action for corresponding CN Application No. 201310082626.7, Jun. 30, 2015.

* cited by examiner

*Primary Examiner* — Paul Ip
*Assistant Examiner* — Said Bouziane
(74) *Attorney, Agent, or Firm* — Mori & Ward, LLP

(57) ABSTRACT

A motor control device according to an embodiment includes a first subtractor, a speed controller, and a phase compensating speed observer. The first subtractor subtracts a speed reference from a speed feedback signal to obtain a speed deviation. The speed controller receives the speed deviation and outputs a first torque reference. The phase compensating speed observer receives the first torque reference and a speed of a controlled object including a motor, and outputs the speed feedback signal. The phase compensating speed observer includes a delay element model having an integral element of an order optimally satisfying a setting condition based on a degree of easiness for implementation and a degree of usefulness for phase delay compensation of the speed feedback signal to the speed reference.

4 Claims, 20 Drawing Sheets

C: PATH FOR DISTURBANCE COMPENSATION

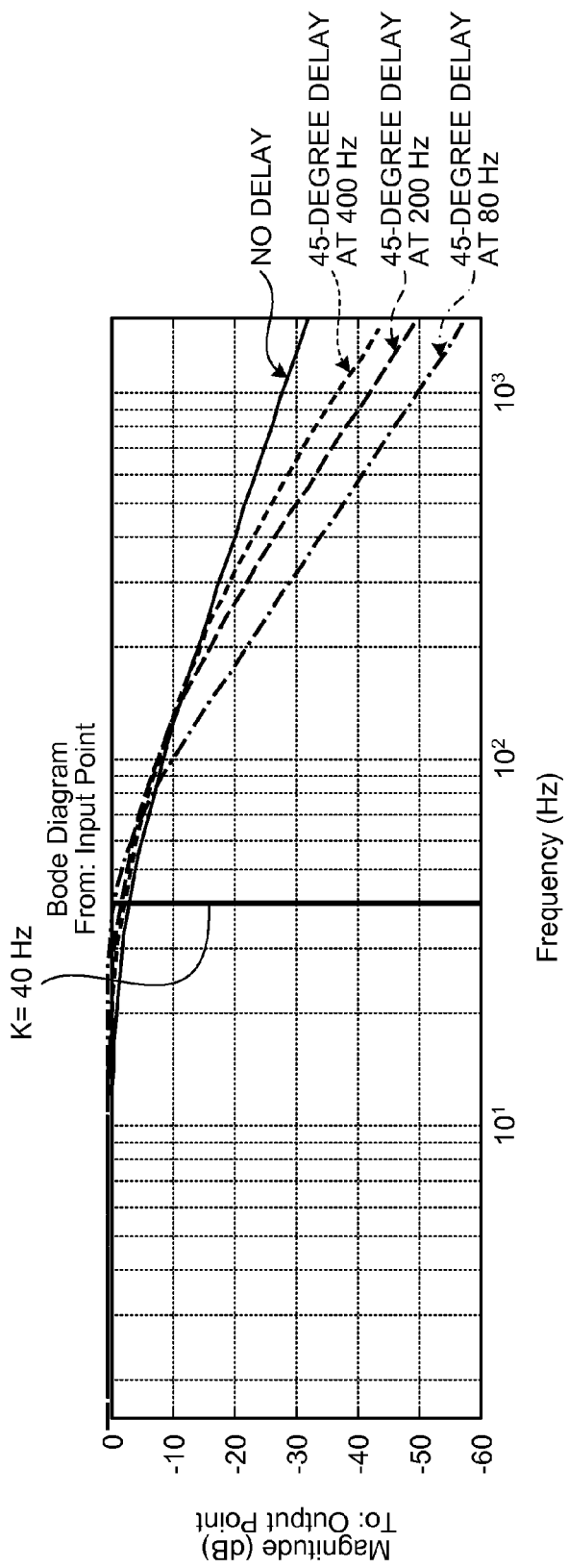

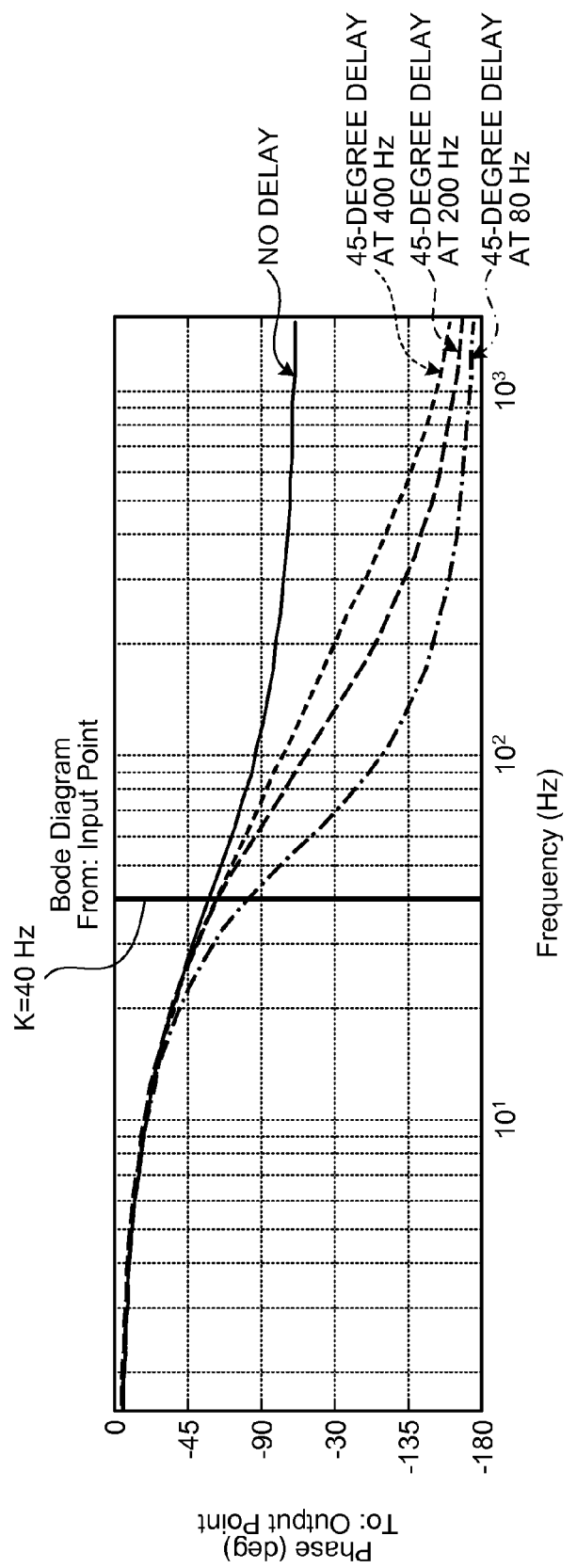

MOTOR CONTROL DEVICE

CROSS-REFERENCE TO RELATED APPLICATION

This application is based upon and claims the benefit of priority of the prior Japanese Patent Application No. 2012-185923, filed on Aug. 24, 2012, the entire contents of which are incorporated herein by reference.

FIELD

The embodiments discussed herein are directed to a motor control device.

BACKGROUND

Each of Japanese Patent No. 3856215 and Japanese Patent Application Laid-open No. 2008-299573 discloses, for example, a configuration to make it possible to increase a control gain of a speed control loop in a motor control device by compensating a phase delay of a vibrational component in the speed control loop using a phase compensating speed observer. The phase compensating speed observer is provided, on the front stage side, with an equivalent rigid body model that assumes a controlled object as a rigid body, and, on the rear stage side, with a delay element model simulating a delay element that exists in a controller at a stage later than a PI controller or that exists in the controlled object. The equivalent rigid body model and the delay element model are connected in series to each other. The phase compensating speed observer supplies an output of the PI controller to the equivalent rigid body model, and also feeds back a signal obtained by subtracting an output of the delay element from a speed of the controlled object to an integral element through multiplication by a stabilizing gain. Then, the phase compensating speed observer outputs, as a speed feedback signal of the speed control loop, an input entered into the delay element model.

The phase compensating speed observer disclosed in Japanese Patent No. 3856215 mentioned above is provided with a delay element model including only one integral element (1/s), that is, a first-order delay element model whose order is one. The phase compensating speed observer disclosed in Japanese Patent Application Laid-open No. 2008-299573 mentioned above is provided with a fourth-order delay element model in which the order of the integral element (1/s) is estimated to be high by exactly simulating the delay element existing in the controlled object.

If the order of the integral element in the delay element model is too low as disclosed in Japanese Patent No. 3856215 mentioned above, a problem occurs that the phase of a fedback speed leads too much ahead of that of a speed reference. If, in contrast, the order of the integral element in the delay element model is too high as disclosed in Japanese Patent Application Laid-open No. 2008-299573, when the observer is actually implemented as software, problems occur in that the observer spends redundant processing time and the control gain can be set only within a narrow range.

SUMMARY

A motor control device according to an aspect of the embodiments includes a first subtractor, a speed controller, and a phase compensating speed observer. The first subtractor subtracts a speed reference from a speed feedback signal to obtain a speed deviation. The speed controller receives the speed deviation and outputs a first torque reference. The phase compensating speed observer receives the first torque reference and a speed of a controlled object including a motor, and outputs the speed feedback signal. The phase compensating speed observer includes a delay element model having an integral element of an order optimally satisfying a setting condition based on a degree of easiness for implementation and a degree of usefulness for phase delay compensation of the speed feedback signal to the speed reference.

BRIEF DESCRIPTION OF DRAWINGS

A more complete appreciation of the present embodiment and advantages associated therewith will be easily understood by reading the following detailed description of the embodiment with reference to the accompanying drawings:

FIGS. 5A and 5B are Bode diagrams of results obtained by simulating the simplified speed control system loop;

DESCRIPTION OF EMBODIMENT

An embodiment of a motor control device disclosed herein will be described below in detail with reference to the accompanying drawings. The same numerals will be given to the same configurations, and thereby, redundant description thereof will be omitted as appropriate. Note that the present invention is not limited to the exemplification in the embodiment.

Figure 1:
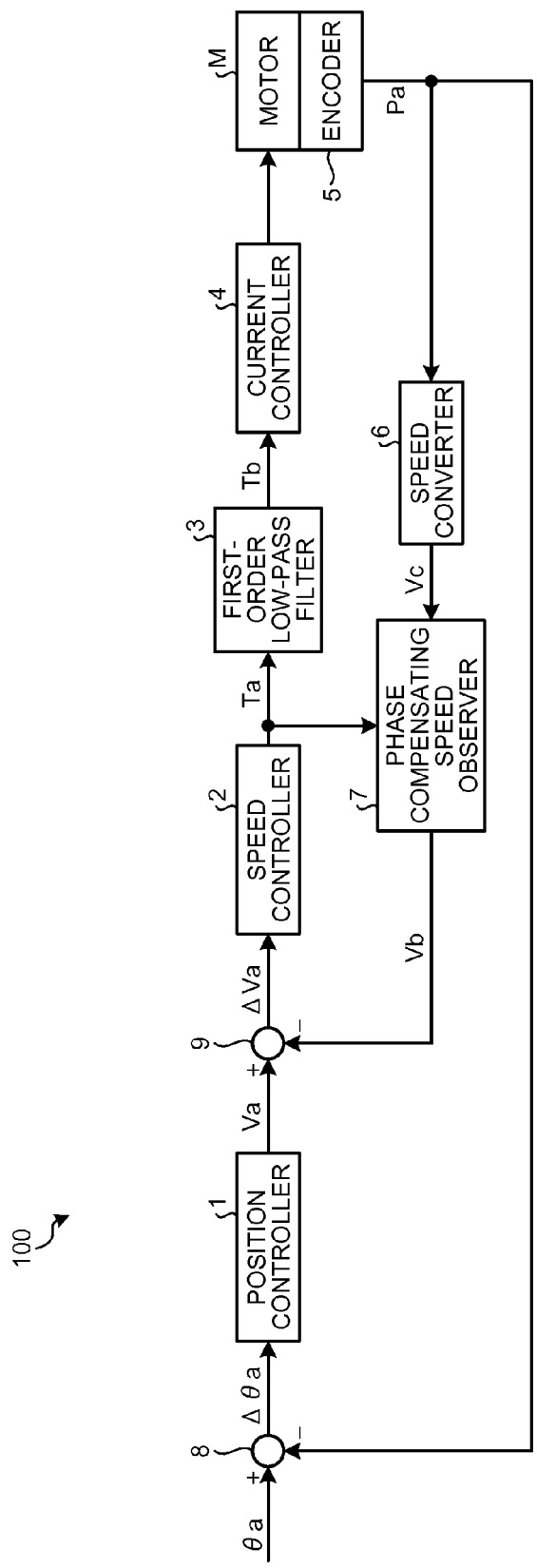
FIG. 1 is a block diagram illustrating a system configuration of an entire motor control device according to an embodiment.

First, a schematic configuration of the motor control device according to the present embodiment will be described using FIG. 1. As illustrated in FIG. 1, the motor control device 100 controls a rotational position Pa (rotation angle) of a motor M based on a position reference θa supplied from a higher-level control device (not illustrated). Note that figures and explanations given below will be described all in the form of transfer functions. In FIG. 1, the motor control device 100 of the present embodiment includes a position controller 1, a speed controller 2, a first-order low-pass filter (first-order LPF) 3, a current controller 4, a speed converter 6, and a phase compensating speed observer 7.

A position error Δθa is obtained as a difference between the supplied position reference θa and the rotational position Pa of the motor M detected by an encoder 5 (to be described later). Based on the position error Δθa, the position controller 1 outputs a speed reference Va so as to reduce the position error Δθa.

A speed deviation ΔVa is obtained as a difference between the speed reference Va from the position controller 1 and an observer-estimated speed Vb compensated in phase by the phase compensating speed observer 7 (to be described later). Based on the speed deviation ΔVa, the speed controller 2 outputs a torque reference Ta so as to reduce the speed deviation ΔVa. Note that the speed deviation ΔVa is output from a subtractor 9.

The first-order LPF 3 is composed of, for example, a first-order delay element provided therein with one integral element (1/s), which is not particularly illustrated. The first-order LPF 3 removes the high-frequency band component from the torque reference Ta supplied from the speed controller 2, and thus extracts and outputs only the low-frequency band component. With this operation, the first-order LPF 3 functions as a torque reference filter that suppresses vibration generated at a sampling frequency of the torque reference Ta.

Based on the torque reference Tb from the first-order LPF 3, the current controller 4 outputs a drive current, for example, by pulse-width modulation (PWM) control to the motor M.

The motor M generates torque from the drive current supplied from the current controller 4, and thereby drives a load machine (not illustrated).

The encoder 5 is composed of, for example, a rotary encoder that is mechanically connected to a rotor of the motor M. The encoder 5 detects the rotational position Pa of the motor M.

The speed converter 6 converts a change in the rotational position Pa of the motor M detected by the encoder 5 into a motor speed Vc of the motor M. Specifically, a differentiator (s) can be sufficiently used as the speed converter 6.

The phase compensating speed observer 7 outputs, based on the torque reference Ta output by the speed controller 2 and on the motor speed Vc of the motor M output by the speed converter 6, the observer-estimated speed Vb, which is compensated in phase so as to be advanced in phase relative to the motor speed Vc. A configuration of the phase compensating speed observer 7 will be described later in detail.

The motor control device 100 configured as described above includes a triple loop configuration composed of a feedback loop of a position control system, a feedback loop of a speed control system, and a feedback loop of a current control system. In the feedback loop of the position control system (hereinafter called the position control system loop), after the position reference θa is supplied from the higher-level control device (not illustrated), the control signal and the detection signal are transmitted through the position controller 1, the speed controller 2, the first-order LPF 3, the current controller 4, the motor M, and the encoder 5 in this order, and the feedback is performed thereafter. In the feedback loop of the speed control system (hereinafter called the speed control system loop), the control signal and the detection signal are transmitted through the speed controller 2, the first-order LPF 3, the current controller 4, the motor M, and the encoder 5, the peed converter 6, and the phase compensating speed observer 7 in this order, and the feedback is performed thereafter. Note that, in the present embodiment, a description of the feedback loop of the current control system provided in the current controller 4 is omitted for simple description.

In the speed control system loop among these loops, the phase compensating speed observer 7 compensates a phase delay in the speed feedback signal (motor speed) caused by unignorable influences from fluctuations in characteristic parameters of the motor M (such as a resistance of a motor coil, an inductance of the motor coil, and a motor's moment of inertia), or by a dead time caused by a digital servo. This compensation ensures robustness of response characteristics of the motor M. A detailed description will be made below on the configuration of the phase compensating speed observer 7, which functions as described above.

Figure 2:
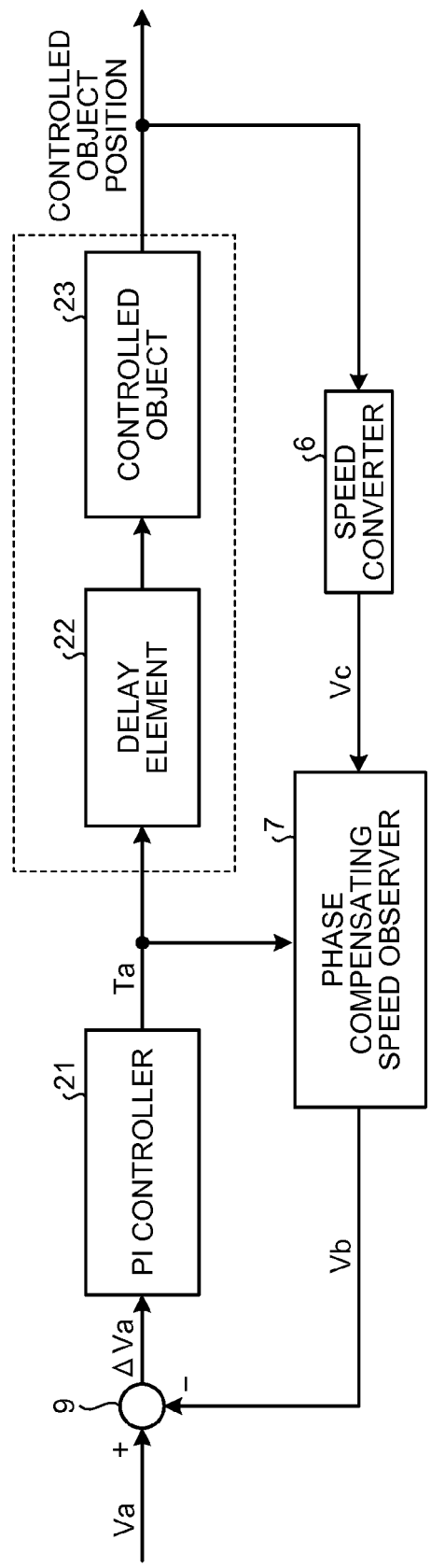
FIG. 2 is a block diagram of a speed control system loop that is substituted from the viewpoint of a phase control.

First, a portion corresponding to the speed control system loop in FIG. 1 can be replaced with a configuration illustrated in FIG. 2. In FIG. 2, the speed control system loop includes a PI controller 21, a delay element 22, a controlled object 23, the speed converter 6, and the phase compensating speed observer 7.

The PI controller 21 corresponds to a functional element of the speed controller 2 in FIG. 1. The PI controller 21 performs what is called a PI operation, in which a proportional operation (P operation) and an integrating operation (I operation) are performed in parallel on the speed deviation ΔVa, and outputs the torque reference Ta. A gain in the proportional operation among these operations corresponds to a speed loop gain (not particularly illustrated).

The delay element 22 corresponds to delay elements included in the first-order LPF 3 and the current controller 4 in FIG. 1. The delay element 22 is an element that generates a delay, relative to a change in the torque reference Ta supplied thereto, in a speed value converted from an output response of the subsequent controlled object, that is, in a response of the motor speed Vc in this example.

The controlled object 23 corresponds to functional elements of the motor M in FIG. 1 and the load machine connected to the motor M. The controlled object 23, has a known inertia moment ratio between the rotor of the motor M and the load machine.

The controlled object speed (motor speed) is the speed value converted from the output (motor position) of the controlled object, and is a delayed response to a change in the speed reference Va supplied to the speed control system loop. If the controlled object speed is directly fed back, the entire speed control system loop is likely to oscillate. Particularly when the speed loop gain is set to a large value, the entire speed control system loop easily oscillates because the high-frequency component in the torque reference Ta significantly delays in phase.

In order to prevent the oscillation, the phase compensating speed observer 7 outputs, as the observer-estimated speed Vb, an assumed controlled object speed that is estimated to be output if the controlled object speed responds without a delay to a change in the torque reference Ta supplied to the controller and the controlled object. Specifically, the phase compensating speed observer 7 refers to the actual change in the torque reference Ta and outputs an observer-estimated speed Vb that is obtained by appropriately advancing the phase of the actually detected controlled object speed. Feeding back the observer-estimated speed Vb can prevent the oscillation in the speed control system loop.

Figure 3:
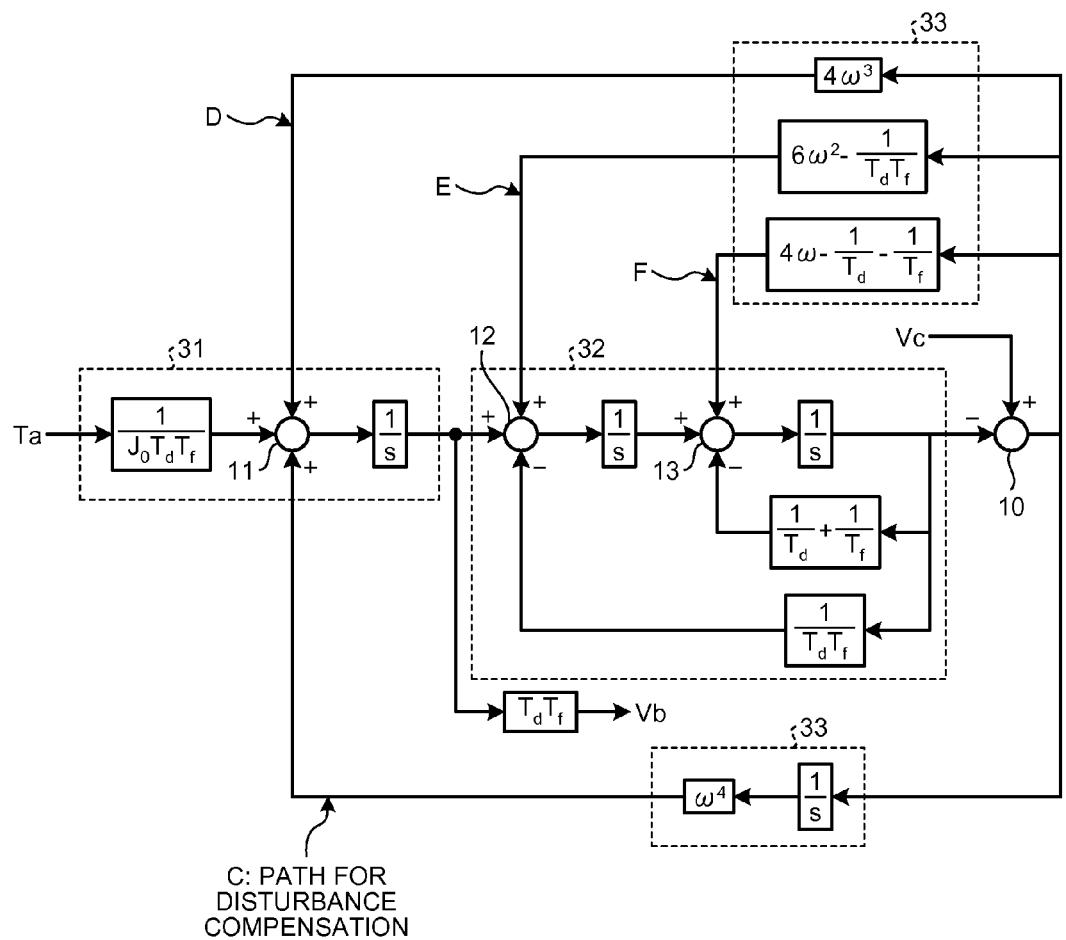
FIG. 3 is a detailed block diagram of a phase compensating speed observer.

FIG. 3 illustrates a detailed block diagram of the phase compensating speed observer 7 in the present embodiment. In FIG. 3, the phase compensating speed observer 7 mainly includes an equivalent rigid body model 31, a delay element model 32, and an observer compensator 33.

The equivalent rigid body model 31 is a model (mathematical model expressed by a transfer function) that assumes the controlled object (load machine) in FIG. 2 as the simplest rigid body.

The delay element model 32 is a model (mathematical model expressed by a transfer function) that simulates the delay element 22 in FIG. 2.

In the phase compensating speed observer 7, the equivalent rigid body model 31 to which the torque reference Ta is supplied from the PI controller 21 is arranged on the front stage side while the delay element model 32 is arranged on the rear stage side, and the equivalent rigid body model 31 is connected in series to the delay element model 32. In this connection configuration, the delay element model 32 can be assumed to produce an output that simulates the actual controlled object speed and that has a small delay in phase. The phase compensating speed observer 7 uses the observer compensator 33 to appropriately compensate an error between the output of the delay element model 32 and the actual controlled object speed. The phase compensating speed observer 7 also feeds back and circulates the error compensated by the observer compensator 33 to the torque reference Ta supplied to the equivalent rigid body model 31. As a result, the output of the delay element model 32 can be further approximated to the actual controlled object speed. In this state, the equivalent rigid body model 31 can be regarded to be producing an output approximate to the controlled object speed from which the phase delay has been eliminated. The phase compensating speed observer 7 outputs this output as the observer-estimated speed having a phase ahead of that of the actual controlled object speed. Note that the above-described error is output from a subtractor 10.

The equivalent rigid body model 31 and the delay element model 32 are provided with integral elements ($1/s$). In order to stably operate the phase compensating speed observer 7, it is necessary to multiply the error between the output of the delay element model 32 and the actual controlled object speed by appropriate observer stabilizing gains, and to add the products to the inputs of the respective integral elements in the equivalent rigid body model 31 and the delay element model 32. The observer compensator 33 is configured to multiply the error by the observer stabilizing gains corresponding to each of the integral elements, and then to distribute the products to the input of each of the integral elements.

In the phase compensating speed observer 7, which functions as described above, the delay element model 32 is desirable to exactly simulate the delay element 22 including the delay elements existing in the first-order LPF 3 and the current controller 4, and further in the controlled object 23 including the motor M. Even in view of only the delay element, in addition to an order of the integral element provided in the first-order LPF 3, an order of the integral element inherent in the current controller 4 needs to be added to the order of the delay element model 32. Thus, the delay element model 32 needs to have a first or higher order. However, each time the total number of the integral elements to be integrated, that is, the order of the integral elements per processing signal is raised by one, it becomes more and more difficult to implement the delay element model 32 as a digital circuit or software.

Figure 4:
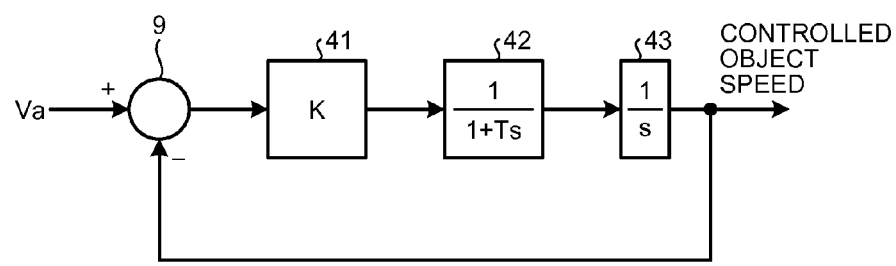
FIG. 4 is a block diagram of a simplified speed control system loop.
Figure 6:
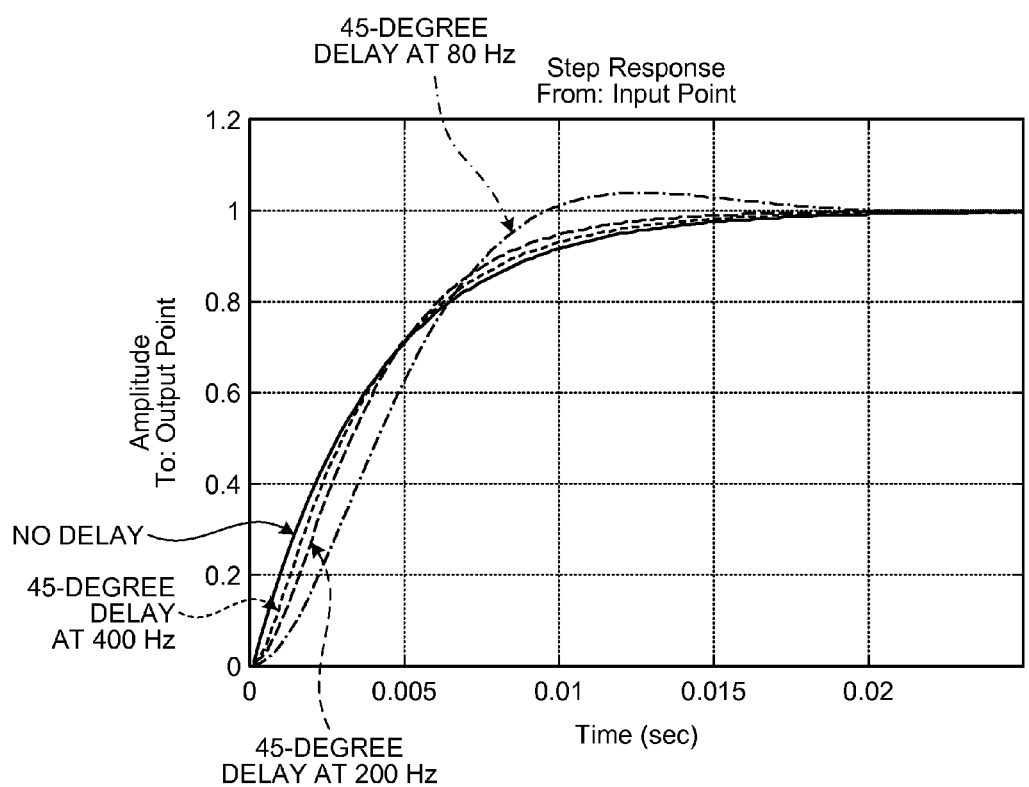
FIG. 6 is a step response diagram of the results obtained by simulating the simplified speed control system loop.

In the present embodiment, the order of the delay element model 32 has been set based on the following consideration. For example, the speed control system loop illustrated in FIG. 2 is replaced with the most simplified model such as the one illustrated in FIG. 4. This model multiplies the speed reference Va supplied thereto by a control gain 41 and a delay element 42 and a controlled object 43, and simply feeds back the output of the multiplication (speed). The control gain 41 is denoted as K; the delay element 42 as a first-order delay element $1/(1+Ts)$; and the controlled object 43 as $1/s$. By appropriately adjusting a time constant T of the delay element 42, simulations of the model were performed in the following cases: when no phase delay exists; and when the phase delay is 45 degrees at the frequencies of 80 Hz (T=2 ms), 200 Hz (T=0.8 ms), and 400 Hz (T=0.4 ms). FIGS. 5A, 5B, and 6 illustrate results of the simulations. FIGS. 5A and 5B are Bode diagrams (gain characteristics in FIG. 5A and phase characteristics in FIG. 5B) of the above-mentioned results. FIG. 6 is a step response diagram of the above-mentioned results. Note that the control gain 41 was set as K=40 Hz in the above-mentioned simulations.

From the phase characteristics of FIG. 5B, it is observed that, in the frequency domain equal to or lower than the control gain K, the curve is nearer to that of the case with no delay as the delay frequency increases, and almost coincides with the curve of the case with no delay when the delay frequency is 400 Hz. This relationship is also observed in the gain characteristics of FIG. 5A and in the step response of FIG. 6. This relationship suggests that the delay elements in the control loop be ignored without a significant influence if the delay frequency is sufficiently higher than (in the example illustrated, roughly 10 times as large as) the control system's response frequency determined by the control gain K.

In principle, the order of the integral elements in the delay element 22 should also be accurately estimated in order to make the delay element model 32 exactly simulate the delay element 22 including the delay elements existing in the first-order LPF 3 and the current controller 4, and further in the controlled object including the motor M. However, from the relationships illustrated in FIGS. 5A, 5B, and 6, it is observed that omitting the estimation hardly affects performance for frequencies sufficiently higher than the response frequency of the speed loop. That is, the inventor of the present application has newly found that raising the order of the delay element model 32 to a predetermined value or more hardly improves a degree of usefulness in the phase delay compensation.

Figure 7A:
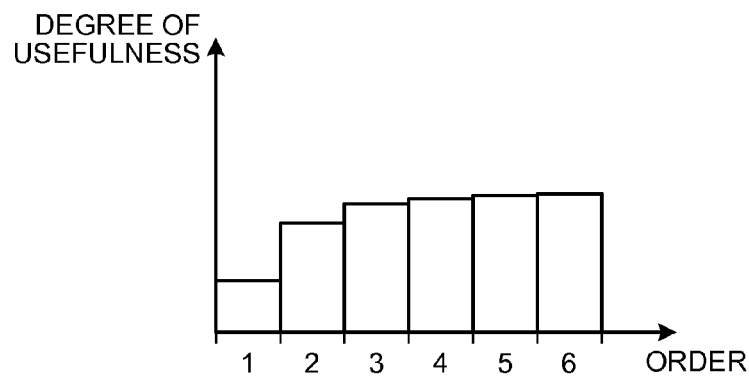
FIGS. 7A to 7C are diagrams illustrating, by order, evaluation values of a degree of usefulness in phase compensation and of a degree of easiness of implementation, and a total of the evaluation values.

In the present embodiment, the degree of usefulness of the order of the integral elements in the phase compensation is defined as the influence of the order evaluated from the functional viewpoint of the phase delay compensation as described above. FIG. 7A is a diagram illustrating, as a distribution against the order, evaluation values of the degree of usefulness in the delay element model 32 illustrated in FIG. 3. In FIG. 7A, while the degree of usefulness always monotonically increases as the order rises, the rate of change of the increase is only small when the order is three or higher, and the degree of usefulness converges into a nearly constant value.

Figure 7B:
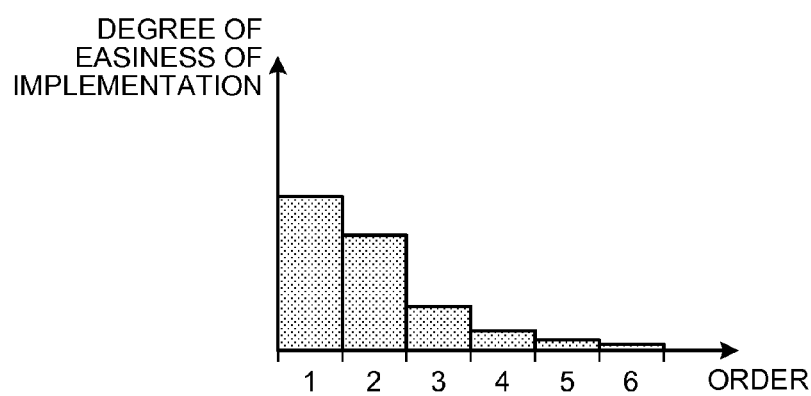

As described above, each time the order of the integral elements accumulating at one processing signal is raised by one, it becomes more and more difficult to implement the delay element model 32 as a digital circuit and software. In the present embodiment, the degree of easiness of implementation at the order of the integral element is defined as the influence of the order evaluated from the viewpoint of realization in a digital circuit and software as described above. FIG. 7B is a diagram illustrating, as a distribution against the order, evaluation values of the degree of easiness of implementation in the delay element model 32 illustrated in FIG. 3. In FIG. 7B, the degree of easiness of implementation monotonically decreases substantially inversely proportionally to the rise in the order. Although a sufficiently feasible value is maintained up to the case in which the order is two, the degree of easiness of the implementation rapidly drops at the third order or higher, thereafter asymptotically approaching to almost zero. Note that FIGS. 7A and 7B illustrate the evaluation values in the same scale.

In the present embodiment, it is desirable that the delay element model 32 be provided with the integral elements of an order satisfying the condition: the sum of the two evaluation values of the degree of usefulness in the phase compensation and the degree of easiness of the implementation is equal to or greater than a predetermined value. In other words, the delay element model 32 is provided with the integral elements of an order at which the sum is equal to or greater than the predetermined value in the distribution of FIG. 7C obtained by summing the distribution of FIG. 7A and the distribution of FIG. 7B. Particularly, in the present embodiment, the sum of the two evaluation values is the highest at the second order. Accordingly, the delay element model 32 is provided with two integral elements, and the entire phase compensating speed observer 7 is of a fourth order (refer to FIG. 3). Note that the entire phase compensating speed observer 7 is a fourth-order system because a path for disturbance compensation has one integral element as will be described later.

Back in FIG. 3, the observer compensator 33 distributes signals (refer to D, E, and F in FIG. 3) to inputs of the single integral element provided in the equivalent rigid body model 31 and of the two integral elements provided in the delay element model 32. These signals (refer to D, E, and F in FIG. 3) are signals obtained by multiplying the error between the output of the delay element model 32 and the actual controlled object speed (motor speed) by appropriate observer stabilizing gains. Further, the observer compensator 33 adds, separately from the above-described distributed signals, a signal (refer to C in FIG. 3) obtained by multiplying the error by an integral element and an observer stabilizing gain to the input of the integral element of the equivalent rigid body model 31. This path is a path for disturbance compensation that takes into account an amount of shift due to disturbances caused by friction elements and the like in the load machine of the controlled object 23. As a result of the above, the observer compensator 33 outputs through a total of four paths via the observer stabilizing gains.

Figure 8A:
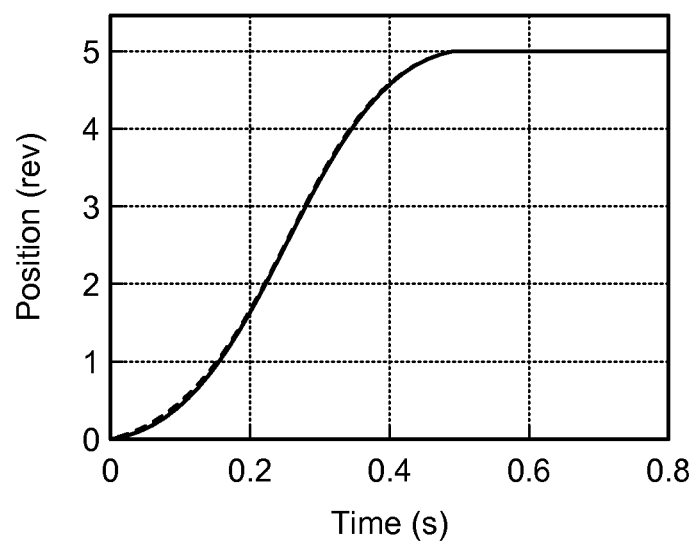
FIGS. 8A to 8D are diagrams illustrating step response data when the motor control device is provided with PI control and the phase compensating speed observer implemented by a second-order delay element model of the embodiment.
Figure 8B:
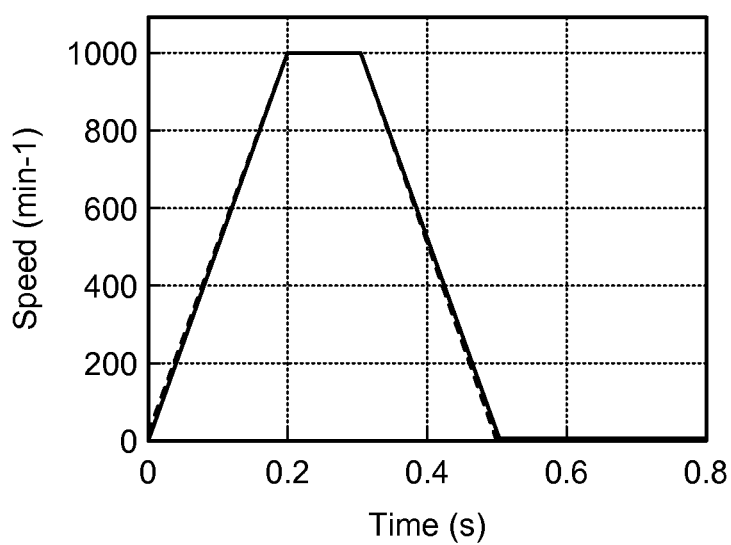
Figure 8C:
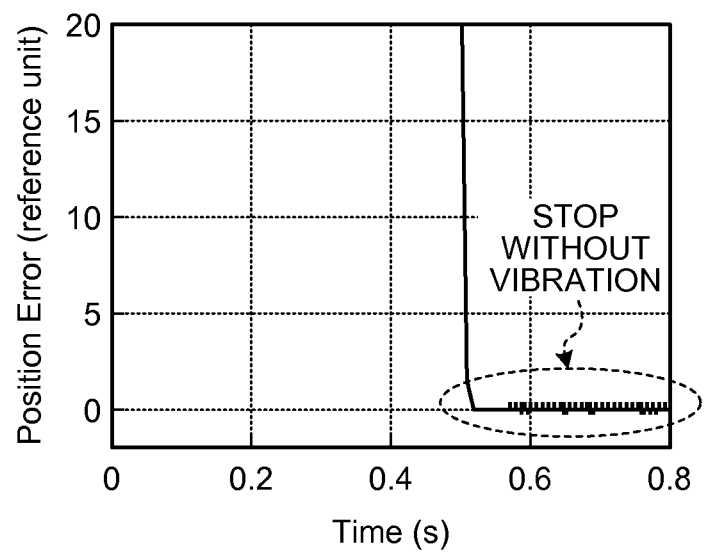
Figure 8D:
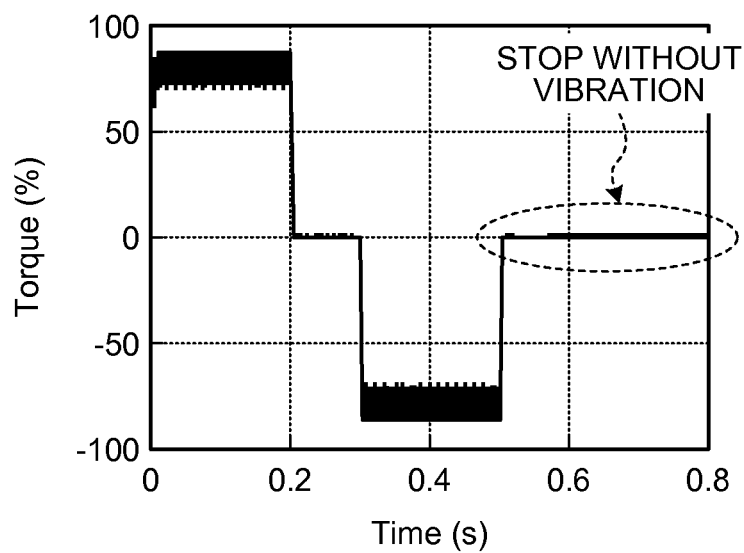
Figure 9A:
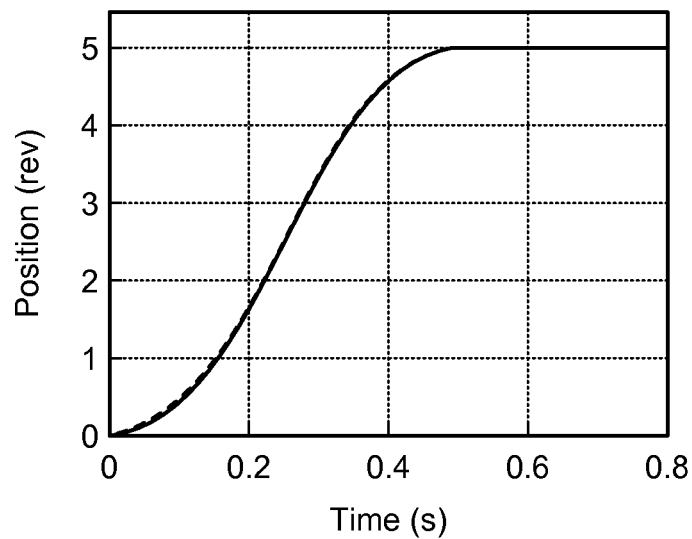
FIGS. 9A to 9D are diagrams illustrating step response data when the motor control device is provided with the PI control and a phase compensating speed observer implemented by a conventional first-order delay element model.
Figure 9B:
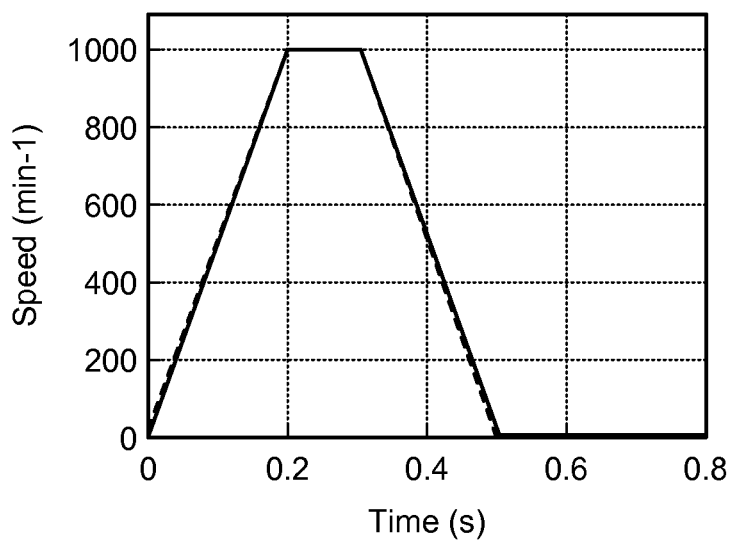
Figure 9C:
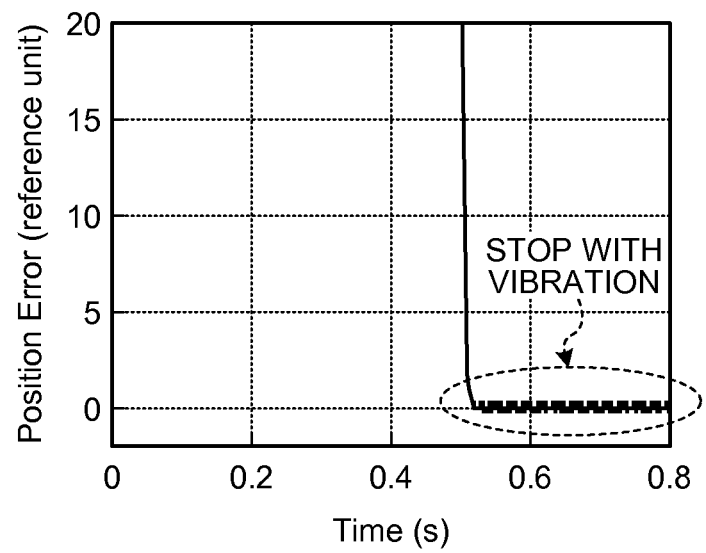
Figure 12A:
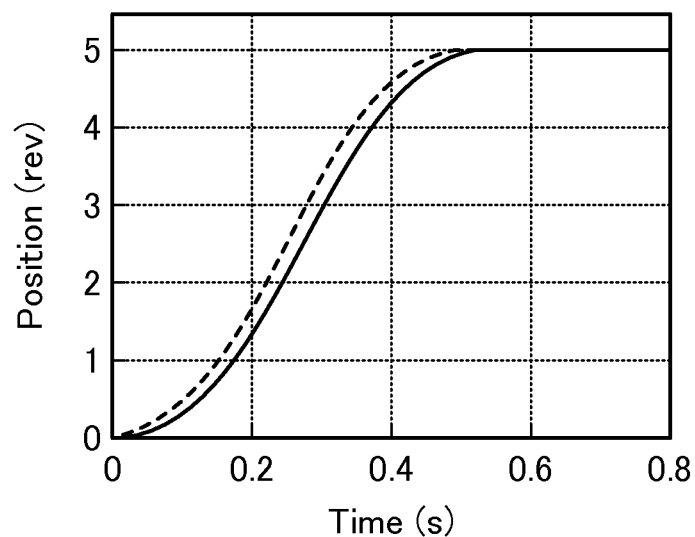
FIGS. 12A to 12C are diagrams illustrating step response data when the motor control device is provided with only the PI control but without the phase compensating speed observer, with the adjustment-free function disabled.
Figure 12B:
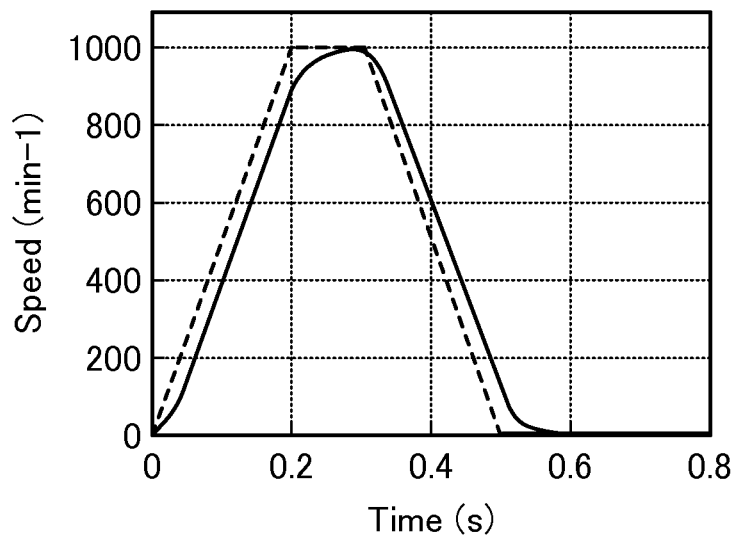

The effectiveness of the motor control device 100 of the present embodiment will be illustrated below with reference to specific step response data of FIGS. 8A to 10D. The axis label "Position" in each of FIGS. 8A, 9A, and 10A represents the position reference supplied from the higher-level control device (not illustrated) and the motor rotational position supplied from the encoder 5 (the same applies to all of FIGS. 12A, 13A, and 14A). Note that, in any of FIGS. 8A, 9A, and 10A, the position reference and the motor rotational position are illustrated to almost coincide with each other because the motor rotational position responds well to the position reference. The axis label "Speed" in each of FIGS. 8B, 9B, and 10B represents the speed reference supplied to the speed control system loop and the motor speed (the same applies to all of FIGS. 12B, 13B, and 14B). Note that, in any of FIGS. 8B, 9B, and 10B, the speed reference and the motor speed are illustrated to almost coincide with each other because the motor speed responds well to the speed reference. The axis label "Position Error" in each of FIGS. 8C, 9C, and 10C represents the position error $\Delta\theta a$, which is the difference between the position reference and the motor rotational position supplied from the encoder 5 and is a signal directly supplied to the position controller 1 (the same applies to all of FIGS. 12C, 13C, and 14C). The axis label "Torque" in each of FIGS. 8D, 9D, and 10D represents a torque reference Tb immediately before being supplied to the current controller 4.

Figure 9D:
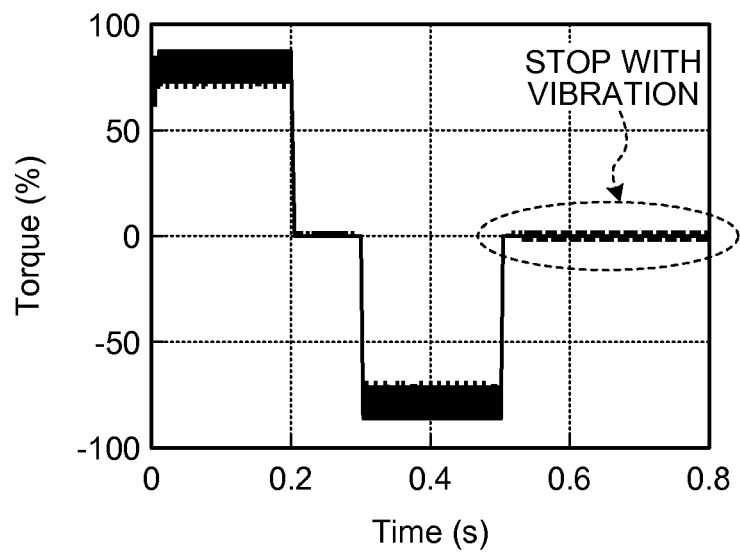
Figure 10A:
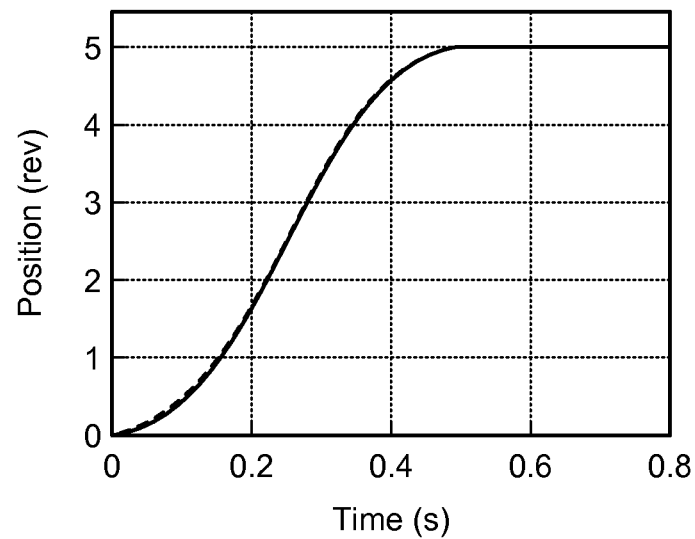
FIGS. 10A to 10D are diagrams illustrating step response data when the motor control device is provided with only the PI control but without the phase compensating speed observer.
Figure 10B:
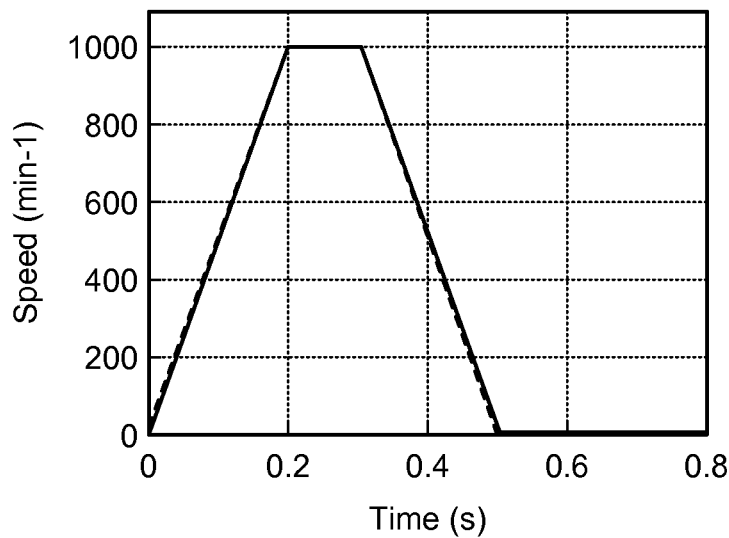
Figure 10C:
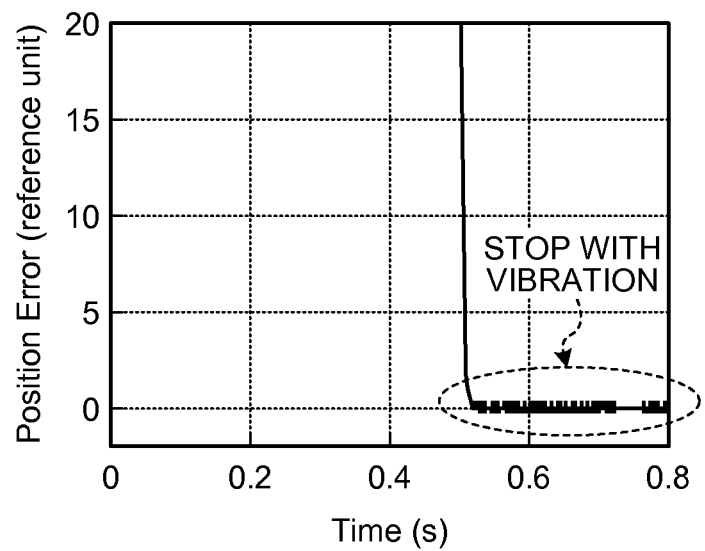
Figure 10D:
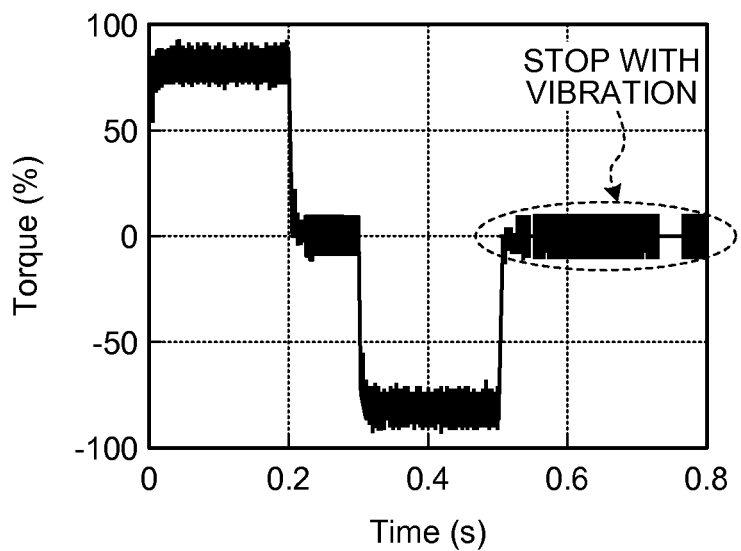

It is observed that vibration occurs when the motor stops (refer to portions in ellipses drawn by dashed lines), in FIGS. 10C and 10D for a case in which the motor control device is provided with only the PI control but without the phase compensating speed observer 7, and in FIGS. 9C and 9D for a case in which the motor control device is provided with the PI control and a phase compensating speed observer implemented by a conventional first-order delay element model. In contrast, it has been found that the suppression effect of the vibration when the motor is stopping is improved (refer to portions in ellipses drawn by dashed lines), in FIGS. 8C and 8D for the case in which the motor control device is provided with the PI control and the phase compensating speed observer 7 implemented by the second-order delay element model 32 of the present embodiment. Providing the phase compensating speed observer 7 of the present embodiment prevents the vibration due to the phase delay.

In the description given above, the torque reference Ta output by the speed controller 2 corresponds to a first torque reference described in claims, and the equivalent rigid body model 31 corresponds to a controlled object model described in claims. The whole of the series-connected combination of the equivalent rigid body model 31 and the delay element model 32 corresponds to an observer object described in claims. The subtractor 9 corresponds to a first subtractor described in claims, and the subtractor 10 corresponds to a second subtractor described in claims.

According to the embodiment described above, an effect as described below is obtained. That is, in the motor control device 100 of the present embodiment, the delay element model 32 is configured to be provided with integral elements of an order optimally satisfying the setting condition based on the degree of usefulness in the phase delay compensation and the degree of easiness of implementation. With this configuration, the phase compensating speed observer 7 with an optimal balance can be achieved in consideration of the trade-off between the performance of the phase delay compensation and the feasibility in software implementation. As a result, it is possible to compensate the phase delay in a wider frequency range as far as actually achievable so as to improve the performance of setting the control gain, and thereby to achieve more accurate follow-up performance of the controlled object speed against the speed reference.

In the phase compensating speed observer 7, the equivalent rigid body model 31, which receives the torque reference Ta output from the speed controller 2, is arranged on the front stage side, while the delay element model 32, which is obtained by modeling the delay elements existing in the control system including the controlled object 23, is arranged on the rear stage side, and the equivalent rigid body model 31 is connected in a series to the delay element model 32. The delay element model 32 can be assumed to produce an output that simulates the actual speed of the controlled object 23 and that has a small delay in phase. The phase compensating speed observer 7 multiplies the error between the output of the delay element model 32 and the actual speed of the controlled object 23 by the observer stabilizing gains of the observer compensator 33 to compensate the error, and thereafter, adds the products to the equivalent rigid body model 31 and the delay element model 32 to circulate the error. As a result, the output of the delay element model 32 can be further approximated to the actual speed of the controlled object. In this state, the equivalent rigid body model 31 can be regarded to be producing an output approximate to the speed of the controlled object from which the delay elements have been eliminated. By using this output as the speed feedback signal of the speed control system loop, the phase delay in the speed control system loop can be compensated to be eliminated.

The order that optimally satisfies the setting condition is set to be an order at which the sum of the evaluation values of the degree of usefulness in the phase delay compensation and the degree of easiness of implementation is largest. With this setting, the optimal order can be set that takes into account both the degree of usefulness in the phase delay compensation and the degree of easiness of implementation.

Figure 7C:
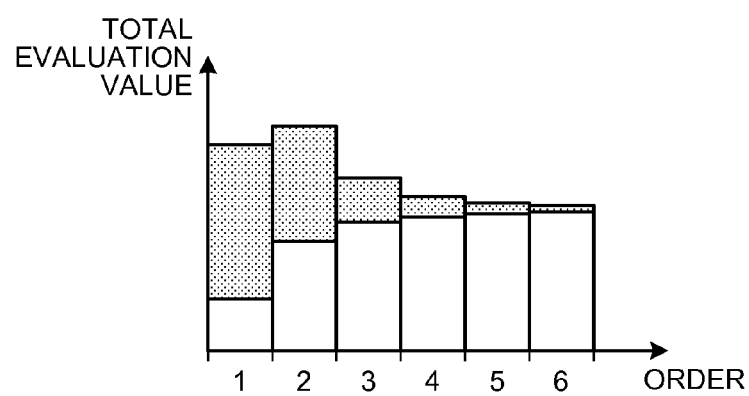

It is found from FIG. 7C that the setting condition is optimally satisfied when the order is two. Thus, among delay element models, the second-order delay element model 32 having the two integral elements is particularly the most suitable.

In the present embodiment, as the path for disturbance compensation that takes into account the amount of shift due to the friction elements in the load machine of the controlled object, the observer compensator 33 adds the first output C to the output of the PI controller 21. In addition, as described above, when the delay element model 32 is of a second order, the phase compensating speed observer 7 has therein four integral elements including one integral element in the equivalent rigid body model 31 and one integral element in the path for disturbance compensation. Corresponding to this, in addition to adding the first output C mentioned above, the observer compensator 33 adds, to the inputs of the integral elements, the second output D, the third output E, and the fourth output F, which are multiplied by the respective stabilizing gains, thereby making it possible to stabilize the phase compensating speed observer 7.

A modification of the above-described embodiment will be described below.

(1) Application to Motor Control Device Having Disturbance Observer

The above-described embodiment describes the case in which the fourth-order phase compensating speed observer 7 (second-order with only the delay element model 32) is applied to the motor control device 100 that does not compensate the load moment of inertia using a disturbance observer. In other cases, a favorable effect is also obtained by applying the fourth-order phase compensating speed observer 7 to a motor control device that compensates the load moment of inertia by using a disturbance observer.

Figure 11:
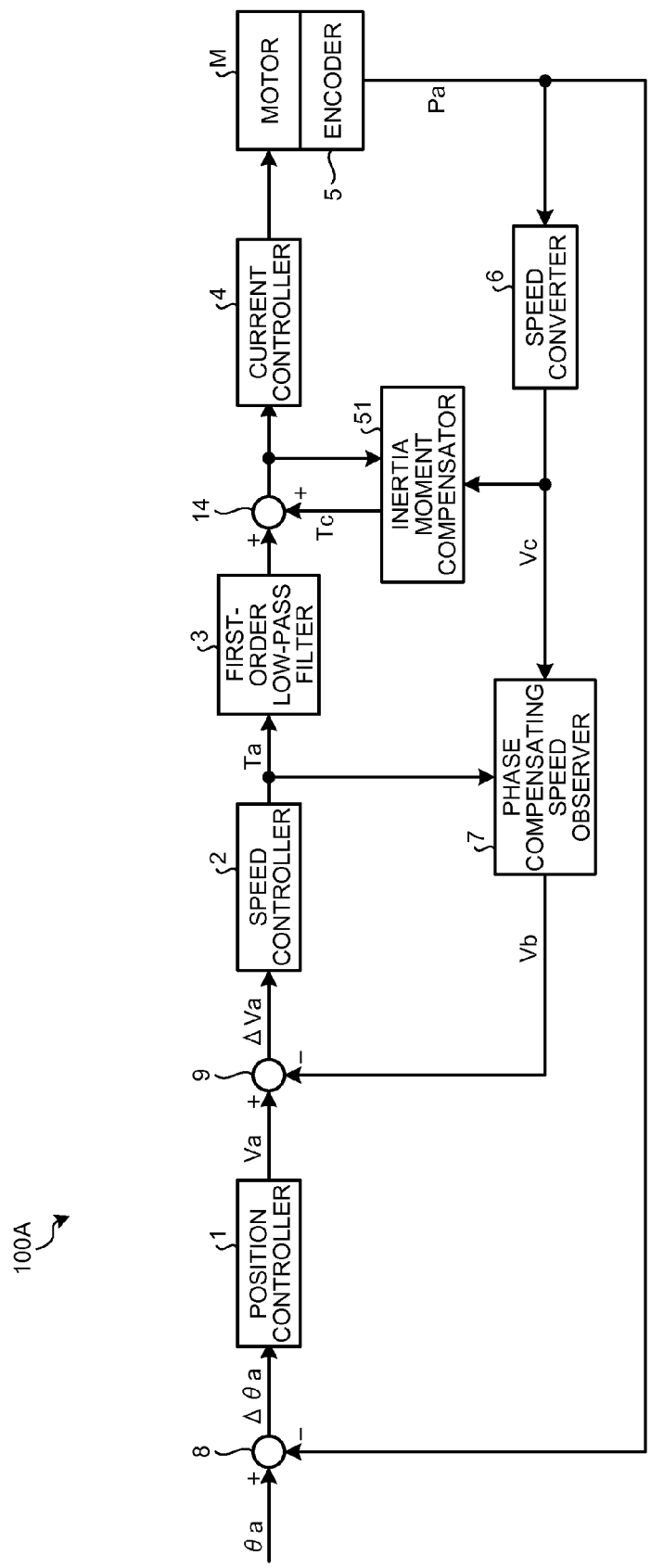
FIG. 11 is a block diagram a block diagram illustrating a system configuration of an entire motor control device when the motor control device is provided with an adjustment-free function.

As illustrated in FIG. 11, a motor control device 100A of the present modification further includes an inertia moment compensator 51, in addition to the configuration illustrated in FIG. 1 The inertia moment compensator 51 calculates an estimated value of disturbance torque based on the rotational speed Vc of the motor M output by the speed converter 6 using the internal disturbance observer and on the torque reference that is output from the first-order LPF 3 and is about to be supplied to the current controller 4. The estimated value of disturbance torque is added, as an estimated disturbance torque Tc, at an adder 14 to the torque reference immediately after being output from the first-order LPF 3. In the motor control device 100A of the present modification configured in this manner, the inertia moment compensator 51 adjusts the torque reference so as to reduce the influence of disturbances given to the rotor of the motor M. As a result, the robustness in the response characteristics of the motor M can be ensured even if an inertia moment ratio $J_0$ of the load machine is unknown or fluctuates.

In this manner, the inertia moment compensator 51 uses the disturbance observer to compensate the load moment of inertia of the motor M, thereby approximating the control system to a nominal model. However, when the inertia moment ratio $J_0$ increases, the moment of inertia cannot be compensated completely. An uncompensated portion of the moment of inertia can be regarded to act as a delay element from the viewpoint of the control system. This delay element breaks down the gain balance between the speed control system loop and the position control system loop, so that the entire motor control device 100A becomes likely to oscillate.

To deal with this problem, also in the motor control device 100A of the present modification, the delay element model 32 is configured to be provided with integral elements of an order optimally satisfying the setting condition based on the degree of usefulness in the phase delay compensation and the degree of easiness of implementation. With this configuration, the phase compensating speed observer 7 with an optimal balance can be achieved in consideration of the performance of the phase delay compensation and the feasibility in software implementation. The phase compensating speed observer 7 configured in this manner can compensate a delay element equivalent to the portion of the moment of inertia that cannot be compensated by the inertia moment compensator 51, and thus can further stabilize the control system. In other words, when the phase compensating speed observer 7 is applied to the motor control device 100A that compensates the load moment of inertia by using the above-described disturbance observer, the phase compensating speed observer 7 can functionally complement the compensation of the load moment of inertia by the disturbance observer, and thus is useful.

As a result, also in the present modification, it is possible to compensate the phase delay in a wider frequency range as far as actually achievable and thus improve the performance of setting the control gain, and thereby achieving more accurate follow-up performance of the controlled object speed against the speed reference. Note that the torque reference immediately after being output from the first-order LPF 3 corresponds to the first torque reference described in claims; the adder 14 corresponds to a torque reference adder described in claims; and the torque reference immediately before being supplied to the current controller 4 corresponds to a second torque reference described in claims.

The effectiveness of the motor control device 100A of the present modification will be illustrated below with reference to specific step response data of FIGS. 12A to 14C. Note that only three drawings corresponding to those with suffixes A to C among each group of FIGS. 8A to 8D, 9A to 9D, and 10A to 10D are illustrated as FIGS. 12A to 12C, 13A to 13C, and 14A to 14C, respectively.

Figure 12C:
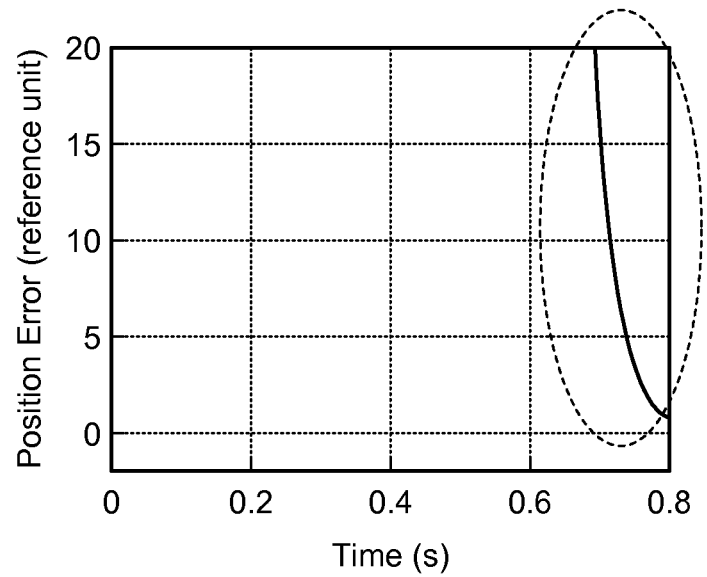
Figure 13A:
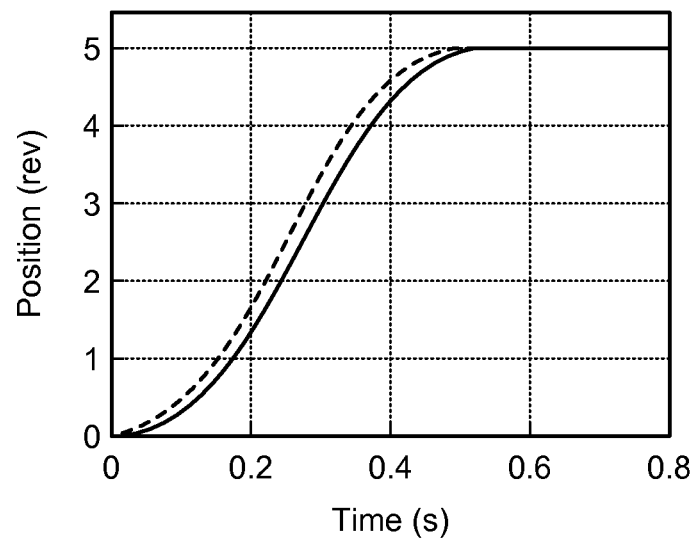
FIGS. 13A to 13C are diagrams illustrating step response data when the motor control device is provided with only the PI control but without the phase compensating speed observer, with the adjustment-free function enabled.
Figure 13B:
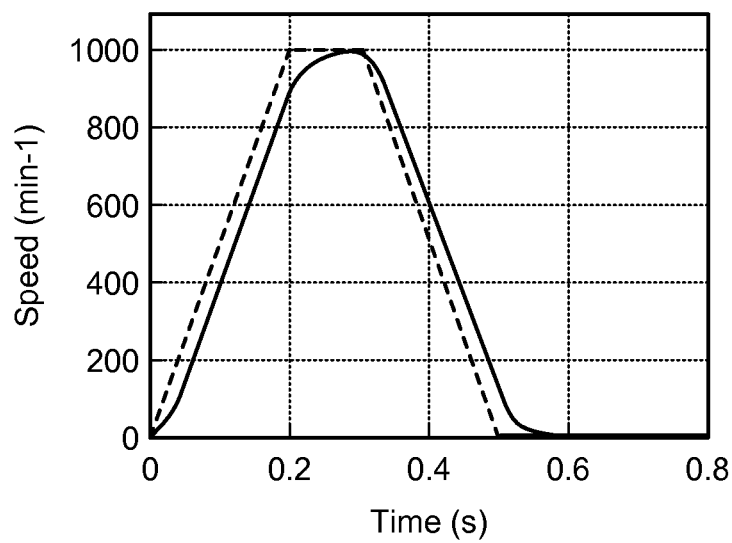
Figure 13C:
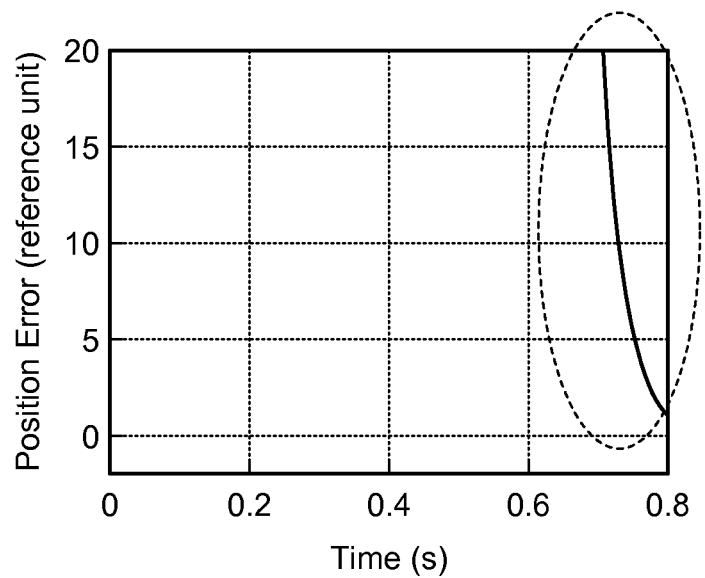
Figure 14A:
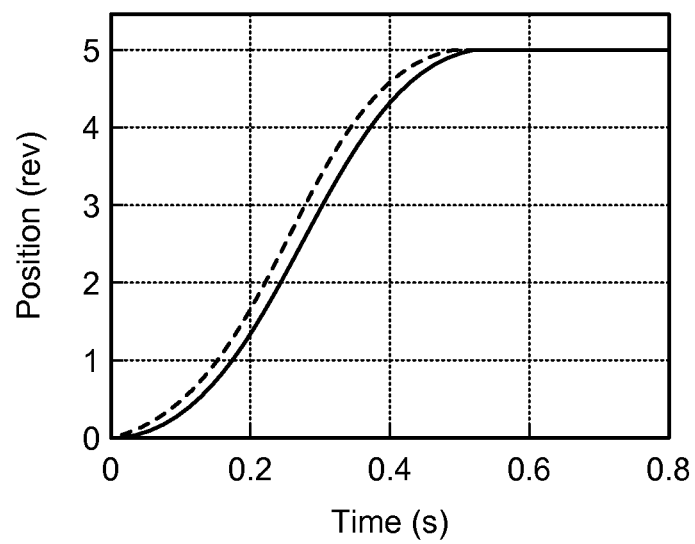
FIGS. 14A to 14C are diagrams illustrating step response data when the motor control device is provided with the PI control and the phase compensating speed observer implemented by a second-order delay element model of a modification, with the adjustment-free function enabled.
Figure 14B:
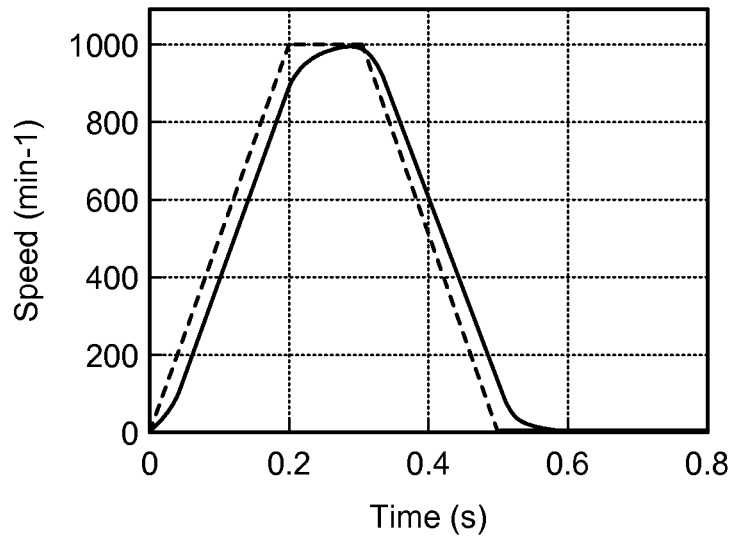
Figure 14C:
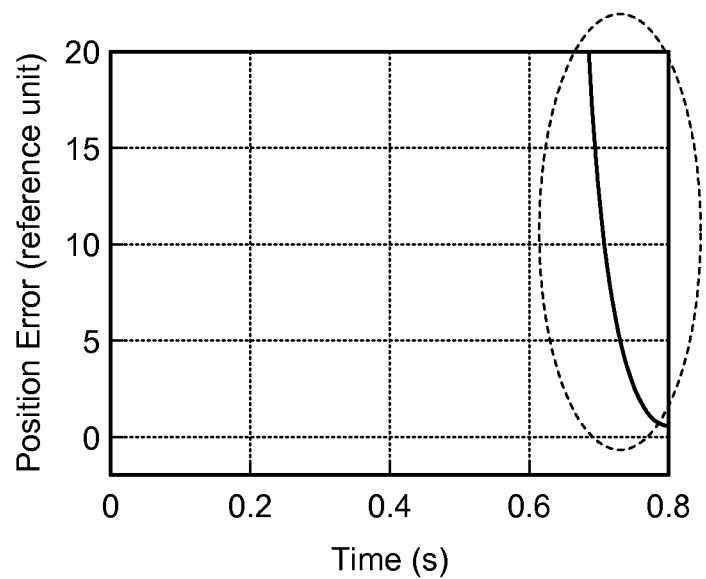

FIG. 12C illustrates the position error when the motor control device is provided with only the PI control but without the phase compensating speed observer 7. FIG. 13C illustrates the position error when the motor control device has the inertia moment compensator 51 and is provided with only the PI control but without the phase compensating speed observer 7. The position error in FIG. 13C is slightly delayed in phase relative to the position error in FIG. 12C (refer to portions in ellipses drawn by dashed lines). This means that a portion of the moment of inertia that was not be compensated as described above acted as a delay element from the viewpoint of the control system. Compared with this, FIG. 14C illustrates the position error when the motor control device has the inertia moment compensator 51 and is provided with the PI control and the phase compensating speed observer 7 implemented by the second-order delay element model 32 of the present modification. This position error in FIG. 14C maintains nearly the same phase as in the case of FIG. 12C (refer to portions in ellipses drawn by dashed lines). This result has proven that the suppression effect of the phase delay is improved.

The techniques illustrated by the above-described embodiment and the modification may be combined and used as appropriate in a way other than those described above.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. A motor control device comprising:
    a first subtractor that subtracts a speed reference from a speed feedback signal to obtain a speed deviation;
    a speed controller that receives the speed deviation and outputs a first torque reference; and
    a phase compensating speed observer that receives the first torque reference directly from the speed controller, and a speed of a controlled object including a motor and that outputs the speed feedback signal, the phase compensating speed observer comprising:
        an observer object that serially includes a controlled object model obtained by modeling the controlled object as a rigid body and a delay element model obtained by modeling delay elements of a control system, and that receives the first torque reference from the speed controller as an input to the controlled object model and outputs the speed feedback signal based on an input to the delay element model;
        a second subtractor that subtracts an output of the delay element model from a speed of the controlled object; and
        an observer compensator that has a plurality of gains and that multiplies an output of the second subtractor by one of the plurality of gains and adds a result of multiplying to the controlled object model or to the delay element model, wherein
    the delay element model consists of two integral elements and two subtractors, the two subtractors of the delay element model are respectively provided at input sides of the two integral elements of the delay element model, the output of the delay element model is input into the second subtractor and the two subtractors of the delay element model.

2. A motor control device comprising:
    a first subtractor that subtracts a speed reference from a speed feedback signal to obtain a speed deviation;
    at speed controller that receives the speed deviation and outputs a first torque reference;
    a phase compensating speed observer that receives the first torque reference directly from the speed controller and a speed of a controlled object including a motor and that outputs the speed feedback signal, the phase compensating speed observer comprising:
        an observer object that serially includes a controlled object model obtained by modeling the controlled object as a rigid body and a delay element model obtained by modeling delay elements of a control system, and that receives the first torque reference from the speed controller as an input to the controlled object model and outputs the speed feedback signal based on an input to the delay element model;
        a second subtractor that subtracts an output of the delay element model from a speed of the controlled object; and
        an observer compensator that has a plurality of gains and that multiplies an output of the second subtractor by one of the plurality of gains and adds a result of multiplying to the controlled object model or to the delay element model;
    an inertia moment compensator that receives a second torque reference and the speed of the controlled object, and outputs an estimated disturbance torque; and
    a torque reference adder that adds the first torque reference to the estimated disturbance torque, and outputs the sum as the second torque reference, wherein
    the delay element model consists of two integral elements and two subtractors, the two subtractors of the delay element model are respectively provided at input sides of the two integral elements of the delay element model, the output of the delay element model is input into the second subtractor and the two subtract ors of the delay element model.

3. A motor control device comprising:
    a means for subtracting a speed reference from a speed feedback signal to obtain a speed deviation;
    a means for generating a first torque reference on the basis of the speed deviation; and
    a means for receiving the first torque reference directly from the means for generating and a speed of a controlled object including a motor to generate the speed feedback signal on the basis of the first torque reference and the speed of the controlled object, the receiving means comprising:
        a means for receiving the first torque reference from the means for generating as an input to a controlled object model obtained by modeling the controlled object as a rigid body and fir outputting the speed feedback signal based on an input to a delay element model obtained by modeling delay elements of a control system, the controlled object model and the delay element model are connected serially;
        a means for subtracting an output of the delay element model from a speed of the controlled object; and
        a means for multiplying an output of the means for subtracting an output of the delay element model by one of a plurality of gains and for adding a result of multiplying to the controlled object model or to the delay element model; and wherein
    the delay element model consists of two integral elements and two subtractors, the two subtractors of the delay element model are respectively provided at input sides of the two integral elements of the delay element model, the output of the delay element model is input into the means for subtracting an output of the delay element model and the two subtractors of the delay element model.

4. The motor control device according to claim 3, further comprising:
    a means for receiving a second torque reference and the speed of the controlled object to generate an estimated disturbance torque on the basis of the second torque reference and the speed of the controlled object; and a means for adding the first torque reference to the estimated disturbance torque to output the second torque reference.

\* \* \* \* \*